(12) United States Patent
Hendricks (10) Patent No.: US 7,216,114 B2
(45) Date of Patent: May 8, 2007

(54) TRANSFER OF MAIL FOLDERS BETWEEN E-MAIL USERS

(75) Inventor: Melanie Hendricks, Lyons, CO (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 09/924,495

(22) Filed: Aug. 9, 2001

(65) Prior Publication Data

US 2003/0033271 A1    Feb. 13, 2003

(51) Int. Cl.
G06F 7/00 (2006.01)
G06F 17/30 (2006.01)
(52) U.S. Cl. ............... 707/1; 707/8; 707/10; 707/100; 707/200
(58) Field of Classification Search ........ 707/200–202, 707/1, 10, 104.1, 8, 100; 709/206, 217
See application file for complete search history.

(56) References Cited

U.S. PATENT DOCUMENTS

| | | | | |
|---|---|---|---|---|
| 5,555,346 A | * | 9/1996 | Gross et al. ................. | 706/45 |
| 5,682,532 A | | 10/1997 | Remington et al. | |
| 5,684,984 A | | 11/1997 | Jones et al. | |
| 5,765,170 A | * | 6/1998 | Morikawa .................... | 707/1 |
| 5,771,384 A | | 6/1998 | Remington et al. | |
| 5,819,272 A | | 10/1998 | Benson | |
| 5,845,067 A | | 12/1998 | Porter et al. | |
| 5,890,163 A | * | 3/1999 | Todd ......................... | 707/200 |
| 5,933,825 A | * | 8/1999 | McClaughry et al. ........ | 707/200 |
| 5,948,058 A | * | 9/1999 | Kudoh et al. ............... | 709/203 |
| 6,014,502 A | * | 1/2000 | Moraes ...................... | 709/219 |
| 6,057,841 A | * | 5/2000 | Thurlow et al. ............ | 715/809 |
| 6,064,977 A | | 5/2000 | Haverstock et al. | |
| 6,182,080 B1 | * | 1/2001 | Clements .................. | 707/102 |
| 6,192,415 B1 | | 2/2001 | Haverstock et al. | |
| 6,199,102 B1 | * | 3/2001 | Cobb ......................... | 709/206 |
| 6,199,106 B1 | * | 3/2001 | Shaw et al. ................ | 709/217 |
| 6,314,438 B1 | * | 11/2001 | Stein et al. ................ | 715/512 |
| 6,516,341 B2 | * | 2/2003 | Shaw et al. ................ | 709/206 |
| 6,526,413 B2 | * | 2/2003 | Schwitters et al. ........ | 707/104.1 |
| 6,571,245 B2 | * | 5/2003 | Huang et al. ............... | 707/10 |
| 6,600,481 B1 | * | 7/2003 | Brown et al. .............. | 345/169 |
| 6,606,649 B1 | * | 8/2003 | Schwitters et al. ........ | 709/206 |
| 6,678,705 B1 | * | 1/2004 | Berchtold et al. .......... | 707/204 |
| 6,684,239 B1 | * | 1/2004 | Flepp et al. ............... | 709/206 |
| 6,708,205 B2 | * | 3/2004 | Sheldon et al. ............ | 709/206 |
| 6,725,228 B1 | * | 4/2004 | Clark et al. ................ | 707/102 |
| 6,772,143 B2 | * | 8/2004 | Hung ......................... | 707/3 |

(Continued)

FOREIGN PATENT DOCUMENTS

GB        2391649        *    2/2004

Primary Examiner—John E. Breene
Assistant Examiner—Anh Ly
(74) Attorney, Agent, or Firm—Gibb I.P. Law Firm, LLC; Derek S. Jennings, Esq.

(57) ABSTRACT

A method and structure for transferring e-mail folders and files of a sender obtains sender input regarding which folders and files are to be transferred, and a list of recipients of the folders and the files. The invention automatically copies selected folders and selected files into a separate database and notifies the recipient of the transfer. The invention automatically creates, upon acknowledgment of the recipient, new folders in the recipient's e-mail files and copies the selected files into the new folders.

10 Claims, 6 Drawing Sheets

U.S. PATENT DOCUMENTS

| | | | |
|---|---|---|---|
| 6,816,884 B1* | 11/2004 | Summers | 709/206 |
| 2001/0005855 A1* | 6/2001 | Shaw et al. | 709/206 |
| 2001/0034843 A1* | 10/2001 | Hess | 713/201 |
| 2002/0095663 A1* | 7/2002 | Joory | 717/136 |
| 2002/0099719 A1* | 7/2002 | Schwitters et al. | 707/104.1 |
| 2002/0184385 A1* | 12/2002 | Kato | 709/237 |
| 2003/0191799 A1* | 10/2003 | Araujo et al. | 709/203 |
| 2004/0059789 A1* | 3/2004 | Shum | 709/206 |
| 2004/0199529 A1* | 10/2004 | Clark et al. | 707/100 |
| 2004/0225650 A1* | 11/2004 | Cooper et al. | 707/3 |
| 2005/0182761 A1* | 8/2005 | Kato | 707/3 |

* cited by examiner

TRANSFER OF MAIL FOLDERS BETWEEN E-MAIL USERS

BACKGROUND OF THE INVENTION

1. Field of the Invention

The present invention generally relates to the ability to transfer information saved in folders and more particularly to an improved system that provides an automatic transfer of e-mail folders from one user to another user.

2. Description of the Related Art

Historically, information was passed by "criers" who would travel from town to town and spread news and information orally. With the advent of regular postal delivery systems and an increasing literate society, written letters became the predominant means of communication. In turn, modern technology has placed e-mail as the favored instrument for communicating the written word. The term e-mail (or electronic mail) simply comprises the transmission of messages by computer from one person to another. Messages are generally saved until the recipient chooses to read them.

In addition, most advanced e-mail systems such as Lotus Notes mail available from Lotus Corp. Cambridge Mass., USA, provide the ability to store e-mail messages in "Folders". Folders are subdirectories within a computer storage system. Directories are generally areas on a storage disk where the names and locations of files are stored. Folders are a way of logically classifying files and are generally represented as tree structures or boxes within boxes. Folders allow e-mail to be stored in logical files so that the e-mail can be easily retrieved using such logical organization.

However, a problem exists when a user accumulates a large volume of e-mail messages and folders which need to be transferred to another user. Systems such as Lotus Notes mail do not allow the transfer of folders and their content to another Lotus Notes user mail file automatically. More specifically, e-mail systems do not allow two mail files to be opened simultaneously because each mail file requires a separate password/identification to be in effect while it is open and, for security reasons, only one user identification can be in effect at one time. Therefore, such folders must be transferred manually. The impact on time and productivity of such a manual process is substantial. For example, when a user leaves his/her current assignment and someone else has to take over, they need to transfer specific—if not all—mail folders to the new person in charge. To transfer the folders manually, the user has to create these folders in their mail file, copy the e-mails from the previous user and paste them in his/her mail file. Then the user must select the pasted e-mails, and move them to the appropriate folder in their mail file. It is common for a single user to have over 100 folders and such a volume of folders may take many days to manually transfer. Since the frequency of employees changing jobs or assignments is high in most companies, moving e-mail folders from one user to another has a big impact. The invention described below avoids this manual process and provides an automated secure system to transfer such e-mail folders.

SUMMARY OF THE INVENTION

In view of the foregoing and other problems, disadvantages, and drawbacks of the conventional e-mail systems the present invention has been devised, and it is an object of the present invention to provide a structure and method for an improved e-mail system that provides an automated secure system to transfer e-mail folders.

In order to attain the object(s) suggested above, there is provided, according to one aspect of the invention the method of transferring e-mail folders and files of a sender which includes obtaining sender input regarding which files in the folders are to be transferred, and a recipient of the folders. The invention copies selected folders into a separate database and notifies the recipient of the transfer. The invention creates, upon acknowledgment of the recipient, new folders in the recipient's e-mail files and copies the files from the selected folders into new folders. The invention then deletes the folders and the files from the database after copying and confirms completion of the transfer by a message to the sender. The transfer moves the folders and the files, deleting the selected folders and files from the sender's e-mail files. The recipient can change the names of the new folders. The invention specifically identifies the different folders and files which recipients shall receive.

BRIEF DESCRIPTION OF THE DRAWINGS

The foregoing and other objects, aspects and advantages will be better understood from the following detailed description of a preferred embodiment(s) of the invention with reference to the drawings, in which.

DETAILED DESCRIPTION OF PREFERRED EMBODIMENTS OF THE INVENTION

The invention is a tool that automates the folder transfer process, and is triggered by the person who needs to have their mail folders transferred to another user, or other multiple users. With the invention, the user specifies who should receive the folders, the folders and e-mails they wish to transfer over. The invention solves the very time consuming, frustrating manual process described above. The invention described below is preferably embodied in a database as a tool that users can access and use as needed. This way it is accessible in every users mail database and avoids the need to access a different database to activate the transfer process. Alternatively, the invention could be directly incorporated into the e-mail's system template and be available to every user of the e-mail software.

Figure 1:
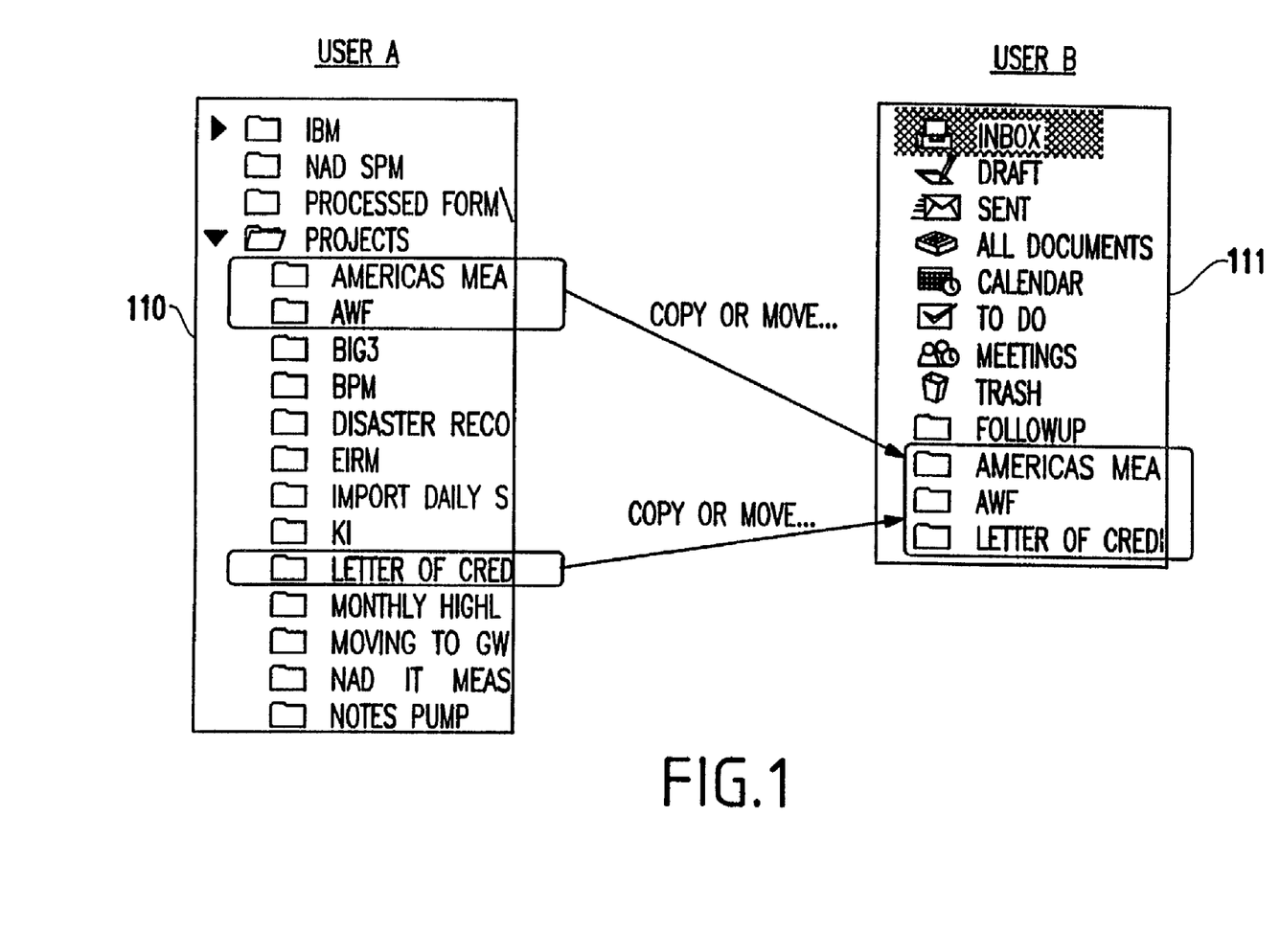
FIG. 1 is a schematic diagram conceptually showing the invention.

The invention also gives the user the possibility of either copying or moving the folders to the new mail file(s). For example, as shown in FIG. 1, user A (110) moves specific folders over to User B's mail file (111), using the invention (this is not an image of what the tool would look like, but an illustration of the process). This way, users can initiate a file transfer, or receive transferred files, without the intervention of a Lotus Notes Developer or IT person, and without any security exposure. This tool is very user friendly, and self explanatory, greatly reducing the impact on time, productivity, money and resources, not to mention a lot of frustration.

Figure 2:
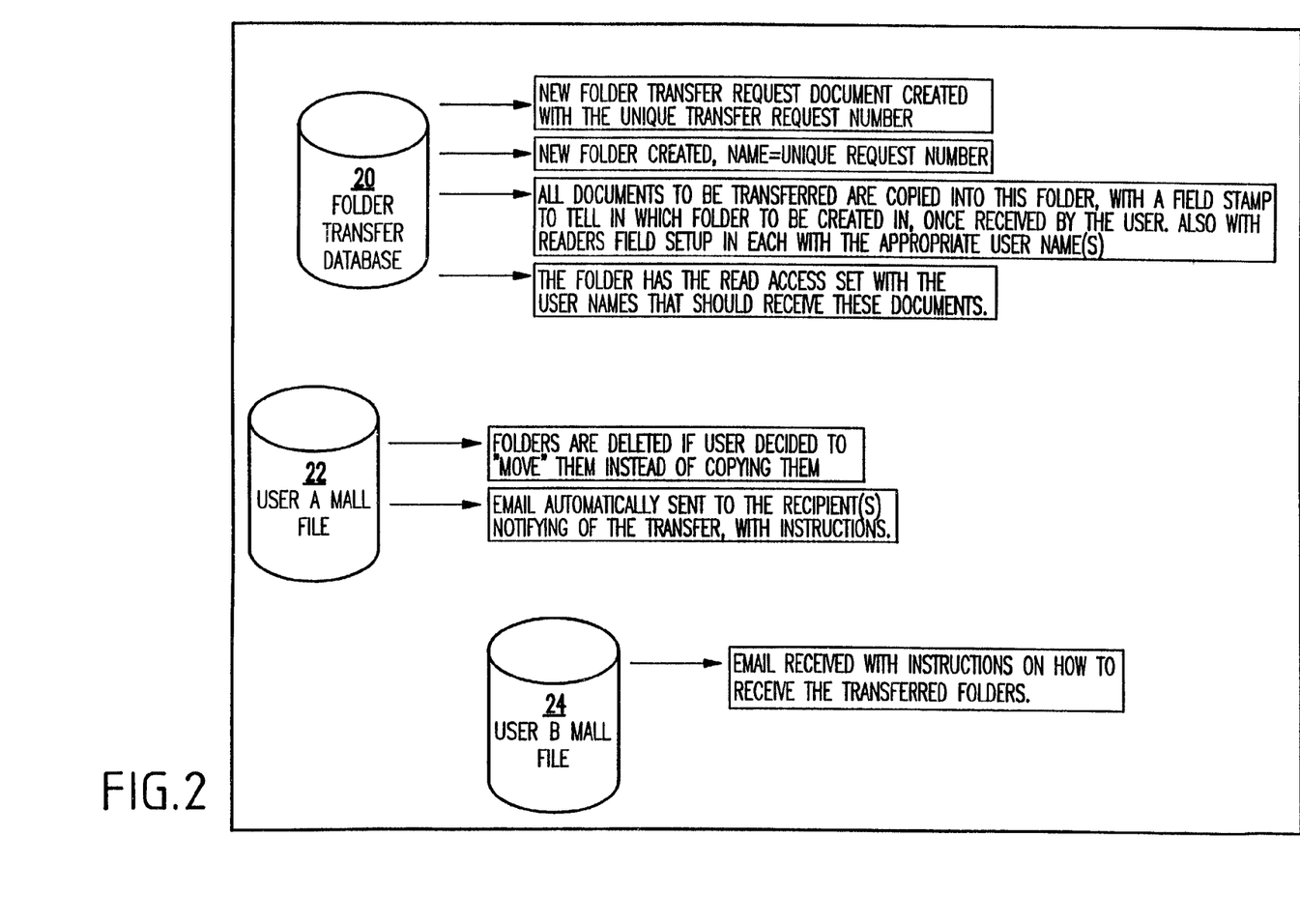
FIG. 2 is a schematic diagram conceptually showing inputs used by the invention.

As shown in FIG. 2, one important aspect of the invention is the use of a temporary database 20. The invention uses the separate folder transfer database 20 to execute and complete the transfer of folders from user A mail file 22 to user B mail file 24. The temporary database 20 is used as a repository for transfer requests. The temporary database 20 can be located on every mail server so that it is accessible to all mail users. As shown in FIG. 2, the folder transfer database 20 creates a new folder based upon a unique transfer request number where the name of the new folder created is the unique request number. With the invention, all documents to be transferred from user A mail file 22 to user B mail file 24 are automatically copied into the folder transfer database 20, with a field containing the name of the folder they belong, to tell in which folder the transferred items will be created in, once they are received by the user (user B mail file 24). Since this transfer database (database 20) is a tool used by many users, each transfer request folder is read protected to allow only the recipient (user B mail file 24) to read the content and execute the transfer.

With respect to the user A mail file 22, folders are deleted if the user decides to move them. If the folders are merely copied, they remain in user A mail file 22. The invention automatically sends an e-mail to the recipient(s) (user B mail file 24) notifying them of the transfer, with instructions. More specifically, the user B mail file 24 receives e-mail instructions on how to obtain the transferred folders.

The invention adds two new actions to the standard mail template preferably under a "Mail Tools" menu. Those actions are preferably identified as "Initiate Folder Transfer" and "Receive Transferred Folders". The folder transfer is initiated by the user who owns the folders (e.g., sender), as shown in item 300 in FIG. 3. The request will be triggered from an action located in the user's mail file "Action" menu, most likely a choice under "Mail Tools".

Figure 3:
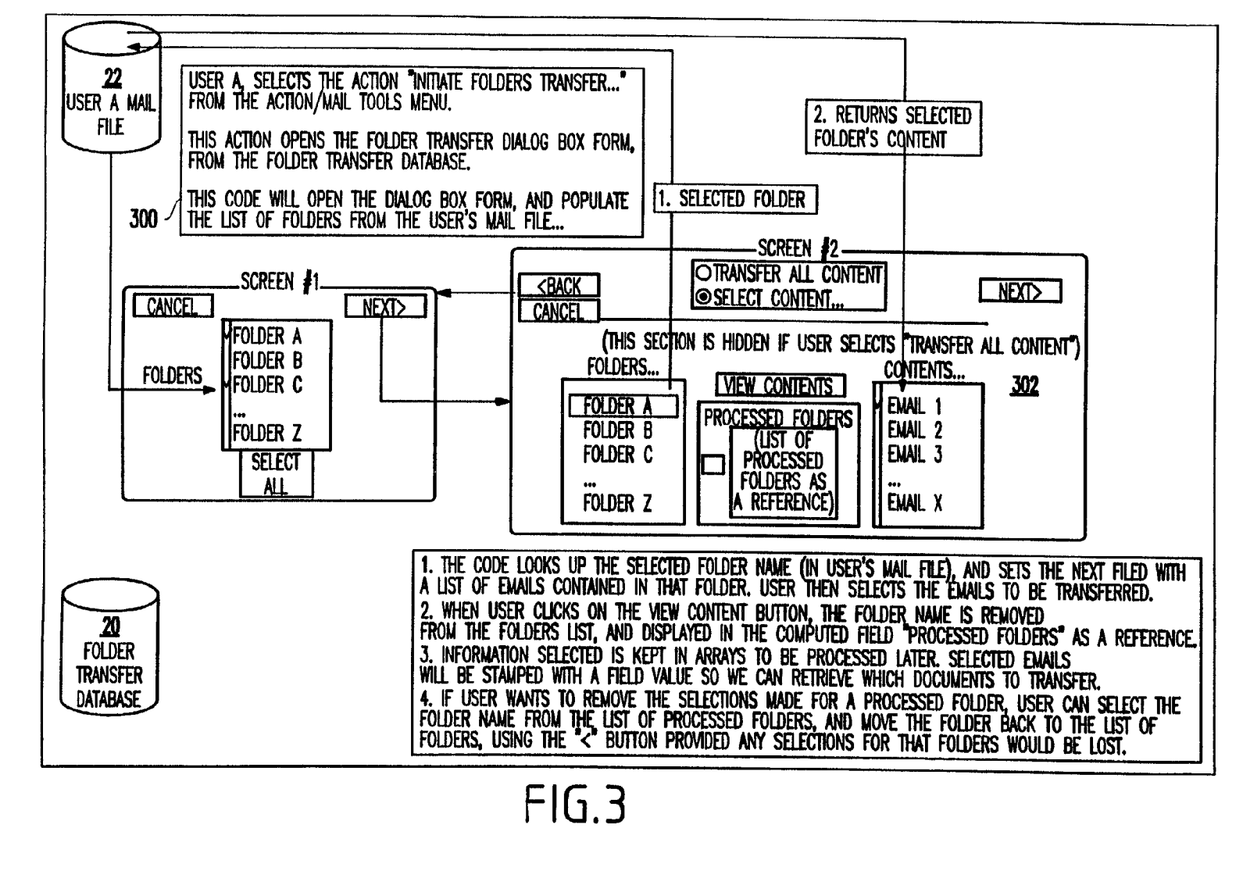
FIG. 3 is a schematic diagram conceptually showing inputs used by the invention.

This action directs the user to data selection forms 301, 302 from the Folder Transfer Database 20. The first form 301 contains a list of all existing mail folders in the user's mail file. This preferably does not include hidden folders, such as the $Inbox folder. The $Inbox folder is too general, usually contains too many e-mails and could not be moved to another user's $Inbox logically, as they are not the recipient (Send to) of those e-mails. If users would need to transfer some e-mails from their $Inbox folder, they would first organize them in folders and then initiate the transfer. In this first dialog 301, the user will be asked to select which folders to transfer. As shown by the check marks in screen 1 (301) folders A and C have been selected. This screen also includes a "select all" button for the convenience of the user. Screen 2 (302) shows the detail content within each folder.

More specifically, the second screen 302 gives the user the opportunity to select the folder content to be transferred. The default choice will be for the entire content of each selected folder to be transferred. However, the user will be given the choice to manually select the e-mails to be transferred for each folder. More specifically, when the user selects the view content button in screen number 2 (302) the invention retrieves the information from user A mail file 22 and displays the folder's content. In a similar manner to that described above, the user checks each of the e-mails which are to be transferred and a check mark remains. The information as selected is kept in arrays to be processed later. The selected e-mails are stamped with a field value so the folder transfer database knows which documents to transfer. If a user wants to remove the selections made for a processed folder, the user selects the folder name from the list of processed folders and moves the selected folder back to the list of folders using the "<" button, as shown in screen 2 (302). If a folder is returned, any individually selected e-mail from that folder would lose their selection check mark. The lower section of screen #2 (302) is hidden if the user selects the "transfer all content" selection at the top of the screen. Where content is not specified, all the contents of each folder will be transferred by default.

Figure 4:
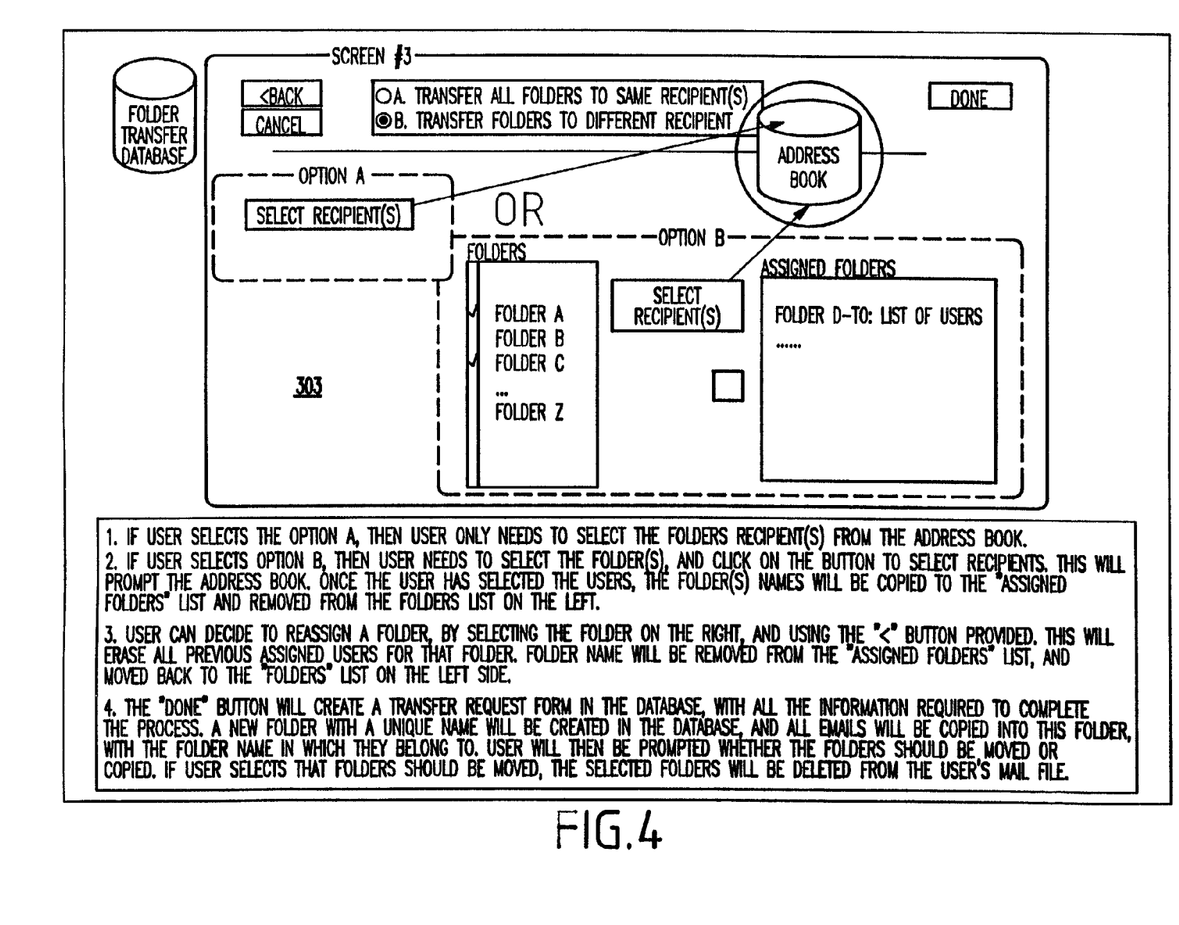
FIG. 4 is a schematic diagram conceptually showing the ability of the invention to transfer folders to multiple recipients.

The next dialog 303 specifies to which user(s) the folders should be transferred. The default choice will be to transfer all folders to the same person(s) (choice A at the top of the screen). However, choice B provides the user with the option to transfer different folders to different users. Therefore, as shown in FIG. 4, if the sending user selects option A, the user merely selects folder recipients from the address block. To the contrary, if the user selects option B, the user must identify which users receive which folders. More specifically, once a user has selected the recipients, the full folder names will be copied into the "Assigned Folders" list and removed from the "Folders" list. This allows each different recipient or group of recipients to receive different combinations of folders. In addition, the "<" button again allows the user to change their mind about who will receive a folder. This removes the folder name from the "Assigned Folders" list and returns it to the "Folders" list. Upon selecting the "Done" button, a transfer document is created in the folder transfer database (database 20) with all the information required to complete the process. A new folder with a unique name will be created in the database, and all e-mail will be copied into this folder with a field stamp in each of them indicating the folder name in which they belong. Since all e-mails to be transferred are copied into the same transfer request folder in database 20, the system needs to keep track in which real folder those e-mails are supposed to be transferred into. For example, if e-mails are copied from the folder "ABC", each of those e-mails to be transferred would have a field with the value "ABC", so the system knows in which folder to transfer them into. The user will then be prompted as to whether the folder should be moved or copied. If the selected folders are to be moved, they will be deleted from the sending user's mail file.

The transfer document will contain the initiator and the recipient(s) specified, the list of folder names and their content, and other necessary information. The transfer document created in database 20 when a folder transfer request is initiated, is basically the heart of the process. It contains all the necessary information for the recipient(s) to receive the folders that were transferred to them. When user B activates the process to receive the transferred folders, the tool first prompts which request they wish to process. This is in case one user has received more than one transfer requests. The transfer document also contains a unique number making it easier to retrieve and identify a specific request. This document contains the information on how many folders are to be transferred, their name and content. A folder with the unique transfer request number is then created in the transfer database (database 20) containing all the e-mails to be transferred. The transfer document contains the name of that folder, in order for the tool to retrieve it, and transfer its content to the appropriate user. In addition, the transfer document will be created with a reader's field set with the database administration role and the recipient(s) names. This only allows the recipient, and database administrators (for maintenance), to access and read this transfer document, preventing unauthorized users to access the data.

The folder containing all the e-mails to be transferred is as well created with a readers restriction field to prevent users, other then the ones specified above, to read its content.

This is to prevent other users from reading the e-mails if they try to access the transfer request database directly. In addition to restricting who can read the transfer request information and data, the transfer document also contains the name of the recipient that is authorized to receive the transferred folders. No other user would be able to have the folders transferred to their mail file because the process is read and write protected. Once the transfer setup is complete, specified users will receive a mail notification to advise them that some folders have been transferred to them. The recipients of these notifications will then have to perform various actions to receive those folders, as shown in FIG. 5.

Figure 5:
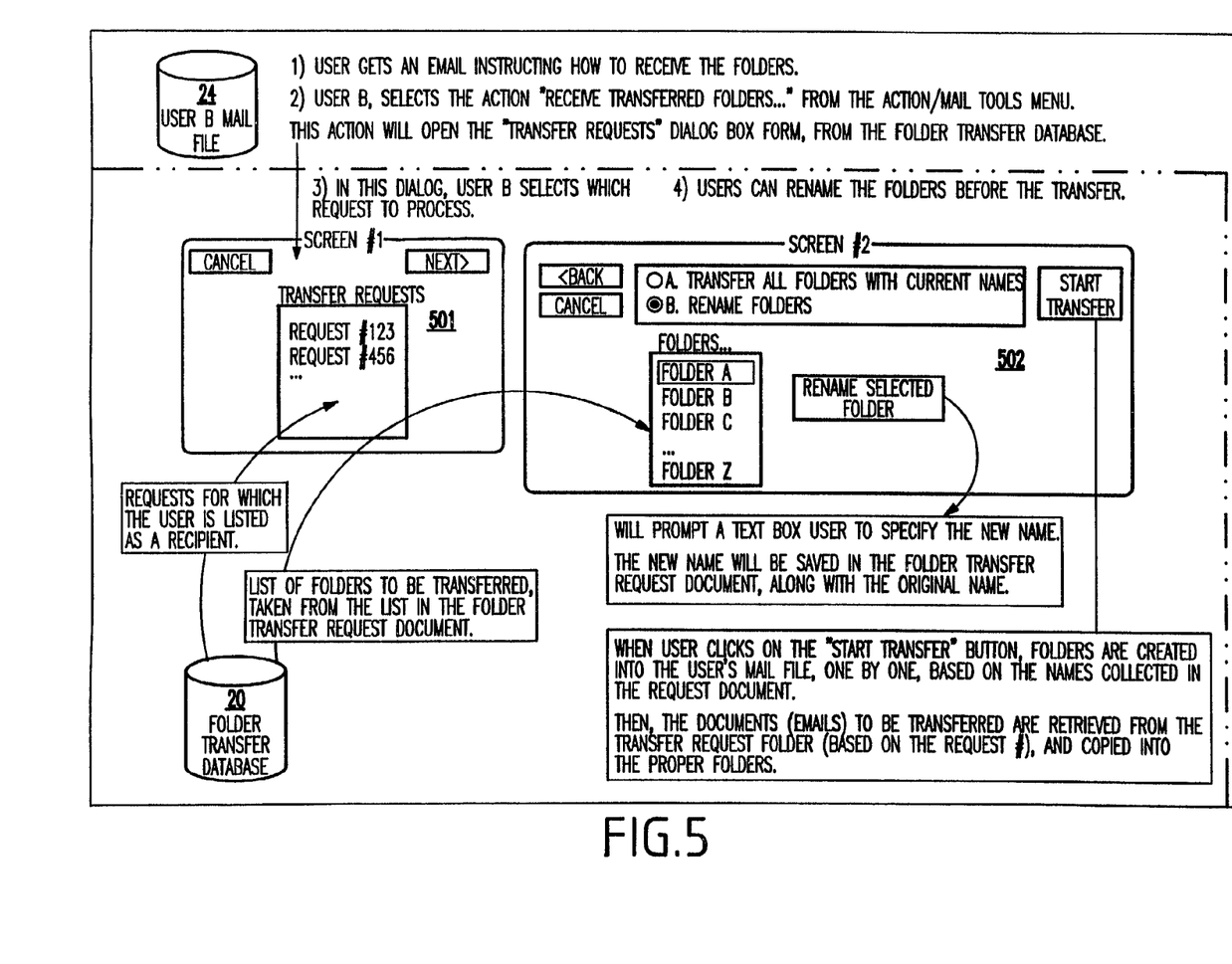
FIG. 5 is a schematic diagram conceptually showing the operation of the invention.

More specifically, as shown in FIG. 5, to receive the transferred folders, the recipient will trigger the "Receive Transferred Folders" action located in the user's mail file "Action" menu, most likely a choice under "Mail Tools". This action will use forms 501, 502 from the Folder Transfer Database. At first, the user will be prompted with a list of transfer requests, if any, as shown in screen 1 (501). The user will be able to process one request at a time. Therefore, the user selects the request number to process (e.g., #123). This action will lookup the Folder Transfer Database 20 by recipient name to view the proper requests. Next, after selecting a transfer to receive, the user will be prompted with the list of folders included in that request in screen 2 (502). At this point, the user can decide to have all the folders transferred as is, or to rename the folders before they are transferred (choices A and B at the top of the screen).

Figure 6:
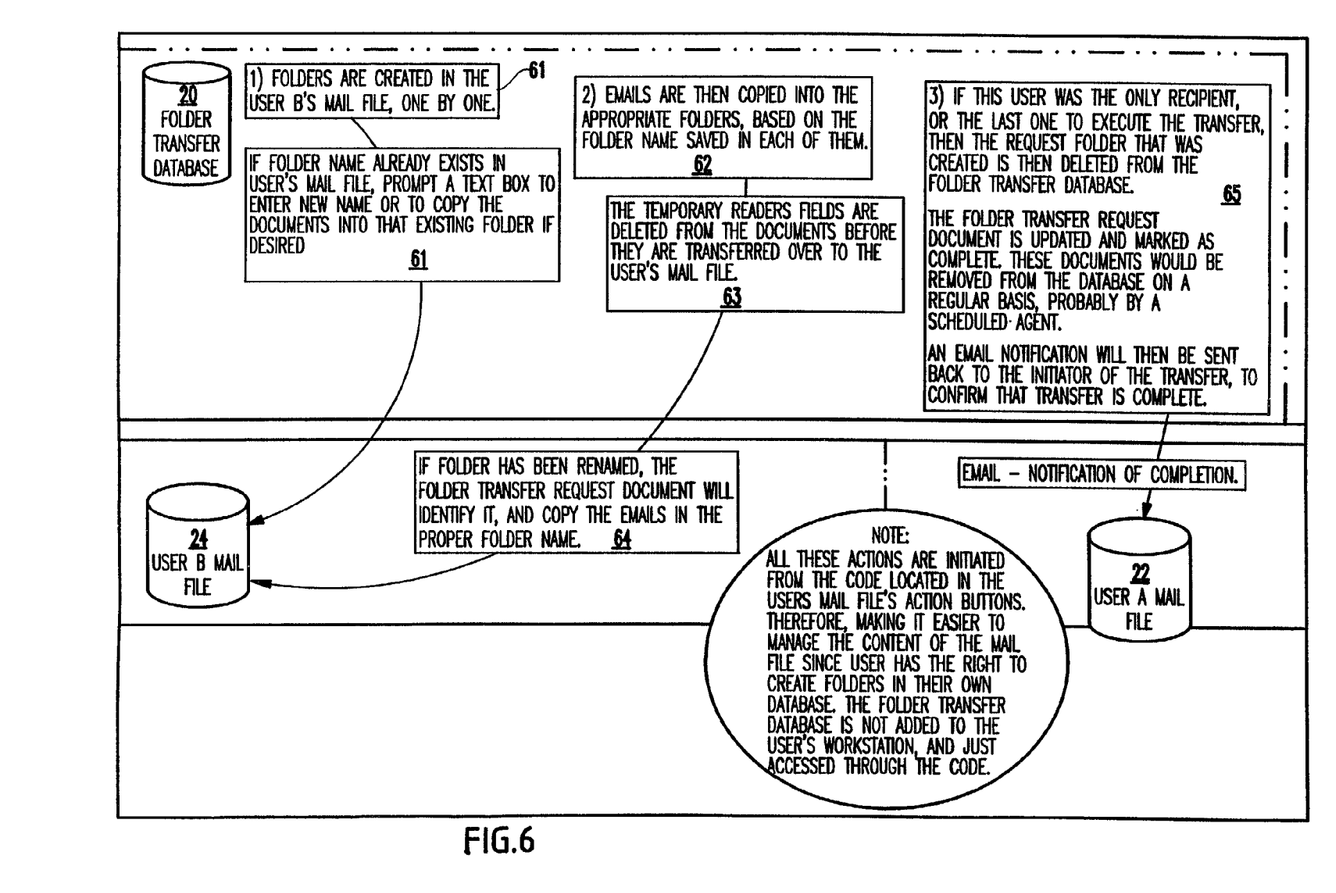
FIG. 6 is a schematic diagram conceptually showing the transfers made by the invention.

The user then selects the "Start Transfer" button shown in screen 2 (502) to begin the folder transfer and, as shown in item 60 in FIG. 6, new folders are created in the recipient's mail file one at a time. If the user decides to receive the folders as they are in the list and the system finds other folders or views with the same name, the user will be prompted to enter a different name (61). This creates a temporary field so that the invention can know where the e-mails (which are associated with the original folder names) are to be copied. The user can also decide to rename some, or all, folders manually by selecting the folder and specifying a new name in a prompt text box (FIG. 5). Folder names are then taken from the request document and created in the users mail file. If the receiving user decides to rename a folder, or if a folder of that name already exists, each e-mail which belongs in that folder is marked with an additional field containing the new folder name. When e-mails are then transferred to the user's B mail file, the tool will retrieve all the e-mails for that folder using the previous folder name, and copy them to the folder with the new name, if one was specified. Then, the system will lookup the unique folder that contains the documents to be copied based on the request number. Each document will be placed in the proper folder based on the hidden field containing the folder name 62. The temporary reader field will be removed from the documents in the user's mail file, and the documents will be saved 63. If a folder has been renamed, the folder transfer request document will identify it, and copy the e-mails in the proper folder name 64.

Also, since documents can be transferred to more than one user and in order to know when the documents can be deleted from Folder Transfer Database, another hidden field will be set with the recipients name to flag the completion. When the recipient's field matches the field containing the names of users that have completed the transfer, then documents will be deleted from the database. More specifically, if the user to which the transfer was made was the only recipient or was the last recipient to receive the transfer, then the request folder that was created is deleted from the folder transfer database 65. The folder transfer request document is updated and marked completed. The folder request documents are removed from the database on a regular basis, preferably by a scheduled agent. The transfer documents could also be kept if desired however, since the folder transfer database will be used by many users, keeping a record of each transfer will impact the performance and speed of the tool. Once the transfer is complete, a mail notification will be sent back to the initiator 22 of the transfer request to informed them that the transfer has been completed.

A scheduled reminder agent will run periodically (e.g., each night) in the Folder Transfer Database to remind recipients to complete the transaction. A schedule can also be setup to automatically delete those documents and folders that are not taken care of in a specified amount of time.

While the invention has been discussed above with respect to e-mail folders, it could be used with an "archiving" functionality which also moves documents out of the user's mail file to another database. Archiving functionalities simply move documents from one place to the other, and therefore do not require a special system like the invention. For example, users can already archive Lotus Notes e-mails and folders in a local database on their system. This feature is built into the mail template.

The invention described above saves a considerable amount of time to users and to IT Support employees. In a world where communication and information is the source of every process, the risk of losing critical information can be a big problem, without mentioning the time wasted on trying to transfer e-mails and folders over, which costs employees and employer's time and productivity. Without the invention, users might destroy information in the absence of a manual solution to transfer the folders over to their mail file or some users may choose to print on paper copy as a reference, which is not an environmental friendly option.

While the invention has been described in terms of preferred embodiments, those skilled in the art will recognize that the invention can be practiced with modification within the spirit and scope of the appended claims.

What is claimed is:

1. A method of transferring e-mail folders and e-mails maintained by an e-mail software program of a sender comprising:

obtaining sender input regarding which folders are to be transferred, which e-mails in said folders are to be transferred, and a list of recipients of said folders and said e-mails, wherein each of said folders comprise a plurality of e-mails accumulated by said sender;

automatically creating, without additional sender or recipient input, new folders in said recipients' e-mail system, maintained by said recipients' e-mail software program, in a location other than said recipients' e-mail inbox;

automatically copying selected e-mails from said e-mail software program of said sender into respective ones of said new folders;

before creating said new folders, automatically copying selected folders and selected e-mails into a separate database;

deleting said folders and said e-mails from said database after said copying; and if said transfer moves said folders and said e-mails, deleting said selected folders and said selected e-mails from said sender's e-mail system.

2. The method in claim 1, further comprising confirming a completion of said transfer by a message to said sender.

3. The method in claim 1, further comprising changing, by said recipient, names of said new folders.

4. The method in claim 1, further comprising specifically identifying different folders and different e-mails different recipients shall receive.

5. A method of transferring e-mail folders and e-mails maintained by an e-mail software program of a sender comprising:
   obtaining sender input regarding which folders are to be transferred and a recipient of said folders, wherein each of said folders comprises a plurality of e-mails accumulated by said sender;
   automatically copying selected folders into a separate database and automatically notifying said recipient of said transfer;
   automatically creating, upon only an acknowledgment of said recipient and without additional sender or recipient input, new folders in said recipient's e-mail system maintained by said recipients' e-mail software program, in a location of other than said recipients' e-mail inbox;
   automatically copying e-mails from said selected folders from software program of said sender into said new folders;
   deleting said folders and said e-mails from said database after said copying; and
   if said transfer moves said folders and said e-mails, deleting said selected folders and said e-mails from the said sender's e-mail system.

6. The method in claim 5, further comprising confirming a completion of said transfer by a message to said sender.

7. The method in claim 5, further comprising changing, by said recipient, names of said new folders.

8. The method in claim 5, further comprising specifically identifying different folders and different e-mails different recipients shall receive.

9. A method of transferring e-mail folders and e-mails maintained by an e-mail software program of a sender comprising:
   obtaining sender input regarding which folders are to be transferred, which e-mails said folders are to be transferred, and a list of recipients of said folders and said e-mails, wherein each of said folders comprise a plurality of e-mails accumulated by said sender;
   automatically creating, without additional sender or recipient input, new folders in said recipients' e-mail system, maintained by said recipients' e-mail software program, in a location other than said recipients' e-mail inbox;
   automatically copying selected e-mails from said e-mail software program of said sender into respective ones of said new folders;
   confirming a completion of said transfer by a message to said sender;
   if said transfer moves said folders and said e-mails, deleting said selected folders and said selected e-mails from said sender's e-mail system;
   before creating said new folders, automatically copying selected folders and selected e-mails into a separate database:
   deleting said folders and said e-mails from said database after said copying; and
   if said transfer moves said folders and said e-mails, deleting said selected folders and said selected e-mails from said sender's e-mail system.

10. A method of transferring e-mail folders and e-mails maintained by an e-mail software program of a sender comprising:
    obtaining sender input regarding which folders are to be transferred and a recipient of said folders, wherein each of said folders comprises a plurality of e-mails accumulated by said sender;
    automatically copying selected folders into a separate database and automatically notifying said recipient of said transfer;
    automatically creating, upon only an acknowledgment of said recipient and without additional sender or recipient input, new folders in said recipient's e-mail system, maintained by said recipients' e-mail software program, in a location of other than said recipients' e-marl inbox;
    automatically copying e-mails from said selected folders from said e-mail software program of said sender into said new folders;
    confirming a completion of said transfer by a message to said sender;
    if said transfer moves said folders and said e-mails, deleting said selected folders and said e-mails from the said sender's e-mail system;
    deleting said folders and said e-mails from said database after said copying; and
    if said transfer moves said folders and said e-mails, deleting said selected folders and said e-mails from the said sender's e-mail system.

* * * * *